US009251410B1

(12) United States Patent
Lin et al.

(10) Patent No.: US 9,251,410 B1
(45) Date of Patent: Feb. 2, 2016

(54) PEOPLE COUNTING SYSTEM AND METHOD (71) Applicant: Quanta Computer Inc., Taoyuan (TW)

(72) Inventors: Keng-Sheng Lin, Taoyuan (TW); Po-Chi Huang, Taoyuan (TW); Yi-Hau Chen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 14/665,070

(22) Filed: Mar. 23, 2015

(30) Foreign Application Priority Data

Sep. 30, 2014 (TW) .............................. 103133865 A (51) Int. Cl.
*G06K 9/00* (2006.01)
*G06K 9/32* (2006.01)
*G06T 7/00* (2006.01)
*H04N 5/247* (2006.01)
*H04N 5/232* (2006.01)

(52) U.S. Cl.
CPC ........ *G06K 9/00369* (2013.01); *G06K 9/00295* (2013.01); *G06K 9/00778* (2013.01); *G06K 9/3233* (2013.01); *G06T 7/0038* (2013.01); *H04N 5/23238* (2013.01); *H04N 5/247* (2013.01); *G06T 2207/20221* (2013.01); *G06T 2207/30201* (2013.01); *G06T 2207/30242* (2013.01)

(58) Field of Classification Search
CPC ............................................ G06T 2207/30242
See application file for complete search history.

(56) References Cited

U.S. PATENT DOCUMENTS

| 7,787,656 | B2* | 8/2010 | Chen | G06T 7/20 356/408 |
| 8,599,267 | B2* | 12/2013 | Kuwano | G06K 9/00228 348/135 |
| 9,087,258 | B2* | 7/2015 | Yu | H04N 7/181 |
| 9,183,432 | B2* | 11/2015 | Sasatani | G06K 9/00369 |
| 2013/0259381 | A1* | 10/2013 | Srinivasan | G06K 9/00221 382/192 |
| 2014/0037147 | A1* | 2/2014 | Yoshio | G06T 7/0081 382/107 |
| 2014/0063191 | A1* | 3/2014 | Bataller | G07C 9/00158 348/46 |
| 2014/0089955 | A1* | 3/2014 | Lee | G06K 9/00771 725/12 |
| 2015/0095107 | A1* | 4/2015 | Matsumoto | G06Q 30/0201 705/7.29 |
| 2015/0317797 | A1* | 11/2015 | Lu | G06T 7/0081 382/103 |

* cited by examiner

*Primary Examiner* — Soo Park
(74) *Attorney, Agent, or Firm* — McClure, Qualey & Rodack, LLP (57) ABSTRACT

A people counting system includes: a top-view, a first and a second side-view image-capturing device, capturing a top-view, a first and a second side-view image respectively; an image stitching module, stitching the top-view, the first and the second side-view image into an ultra wide-angle image; a ROI selecting module, selecting at least one recognition zone and a counting zone; a face recognition module, monitoring the recognition zone to determine a face location corresponding to a face through analyzing the recognition zone; a head recognition module, monitoring the counting zone to determine a head location corresponding to a head through analyzing the counting zone; an object tracking module, the head recognition module, generating a face track and a head track; and a people counting module, counting a first number of face tracks and a second number of head tracks passing through the counting zone and generating a counting result.

10 Claims, 9 Drawing Sheets

PEOPLE COUNTING SYSTEM AND METHOD

CROSS REFERENCE TO RELATED APPLICATIONS

This application claims priority of Taiwan Patent Application No. 103133865, filed on Sep. 30, 2014, the entirety of which is incorporated by reference herein.

BACKGROUND OF THE INVENTION

1. Field of the Invention

The disclosure relates generally to a people counting system, and more particularly, to a people counting system using multiple image-capturing devices.

2. Description of the Related Art

Conventional people counting systems have the following disadvantages: (1) human bodies can be obscured in the shadows of others, resulting in counting errors; (2) when human bodies are obscured by a shadow cast by an object (e.g., a pillar), conventional people counting systems still may produce counting errors; (3) it is difficult for conventional people counting systems to distinguish human bodies and other objects (for example, chairs, cats, dogs and balls); and (4) it is difficult for conventional people counting systems to distinguish short humans (for example, children) and other objects having a height that is similar to a short human.

Accordingly, there is a need for a people counting system using multiple image-capturing devices to distinguish the human body and other objects to solving these problems.

BRIEF SUMMARY OF THE INVENTION

A detailed description is given in the following embodiments with reference to the accompanying drawings.

A people counting system is provided.

In one exemplary embodiment, the disclosure is directed to a people counting system, comprising a top-view image-capturing device, a first side-view image-capturing device, a second side-view image-capturing device, an image stitching module, a region of interest (ROI) selecting module, a face recognition module, a head recognition module, an object tracking module, and a people counting module. The top-view image-capturing device captures image from the top view. The first side-view image-capturing device captures image from a first side view. The second side-view image-capturing device captures image from a second side view. The image stitching module is coupled to the top-view image-capturing device, the first side-view image-capturing device and the second side-view image-capturing device. The image stitching module stitches the top-view image, the first side-view image, and the second side-view image into an ultra wide-angle image. The region of interest (ROI) selecting module is coupled to the image stitching module. The region of interest (ROI) selecting module selects at least one recognition zones and a counting zone from the ultra wide-angle image. The face recognition module is coupled to the region of interest (ROI) selecting module. The face recognition module monitors the recognition zone to determine a face location corresponding to a face through analyzing the recognition zone. The head recognition module is coupled to the ROI selecting module through analyzing the counting zone. The head recognition module monitors the counting zone to determine a head location corresponding to a head. The object tracking module is connected to the face recognition module and the head recognition module. The object tracking module generates a face track and a head track according to the face location and the head location, respectively. The people counting module is coupled to the object tracking module. The people counting module counts the first number of face tracks passing through the counting zone during a time interval and the counts the second number of head tracks passing through the counting zone during the time interval. The people counting module then compares the first number with the second number to generate a people counting result.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the application are described with reference to FIGS. 1 through 8B, which generally relate to a people counting system and a people counting method. It should be understood that the following disclosure provides various different embodiments as examples for implementing different features of the application. Specific examples of components and arrangements are described in the following to simplify the present disclosure. These are, of course, merely examples and are not intended to be limited. In addition, the present disclosure may repeat reference numerals and/or letters in the various examples. This repetition is for the purpose of simplicity and clarity and does not in itself dictate a relationship between the various described embodiments and/or configurations.

It should be noted further that, unless indicated otherwise, all functions described herein may be performed in hardware or as software instructions for enabling a computer to perform predetermined operations, where the software instructions are embodied on a computer-readable storage medium, such as RAM, a hard drive, flash memory or other type of computer-readable storage medium known to a person of ordinary skill in the art. In certain embodiments, the predetermined operations of the computer are performed by a processor such as a computer or an electronic data processor in accordance with code such as computer program code, software, firmware, and, in some embodiments, integrated circuitry that is coded to perform such functions. Furthermore, it should be understood that various operations described herein as being performed by a user may be operations manually performed by the user, or may be automated processes performed either with or without instructions provided by the user.

Figure 1:
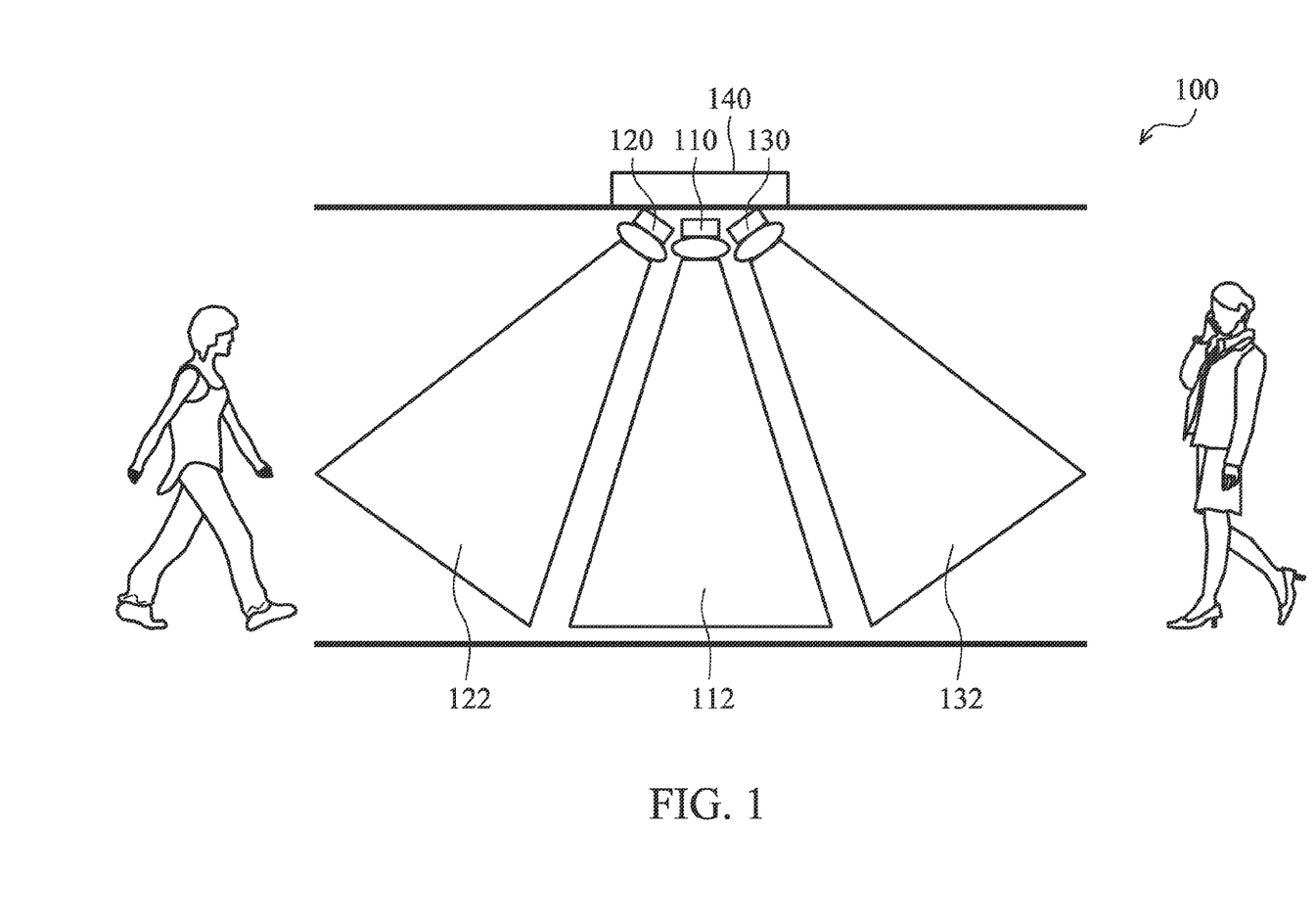
FIG. 1 is an environment schematic diagram including a people counting system according to an embodiment of the present invention.

FIG. 1 is an environment schematic diagram including a people counting system 100 according to an embodiment of the present invention. The people counting system 100 at least comprises a top-view image-capturing device 110, a first side-view image-capturing device 120, a second side-view image-capturing device 130 and a processor 140. The processor 140 is electrically coupled to the top-view image-capturing device 110, the first side-view image-capturing device 120 and the second side-view image-capturing device 130.

As shown in FIG. 1, the top-view image-capturing device 110 is installed between the first side-view image-capturing device 120 and the second side-view image-capturing device 130 and is used to capture a top-view image. The first side-view image-capturing device 120 and the second side-view image-capturing device 130 are used to capture a first side-view image and a second side-view image, respectively, wherein the first side-view image-capturing device 120 and the second side-view image-capturing device 130 are installed at angles where the first side-view image-capturing device 120 and the second side-view image-capturing device 130 can capture the face. The first side-view image-capturing device 120 and the second side-view image-capturing device 130 may be a device or an apparatus, such as a webcam, that can capture images or videos.

In addition, the field of view (FOV) of the top-view image-capturing device 110 is a top-view area 112. The fields of view of the first side-view image-capturing device 120 and the second side-view image-capturing device 130 are a first side-view area 122 and a second side-view area 132, respectively.

Figure 2:
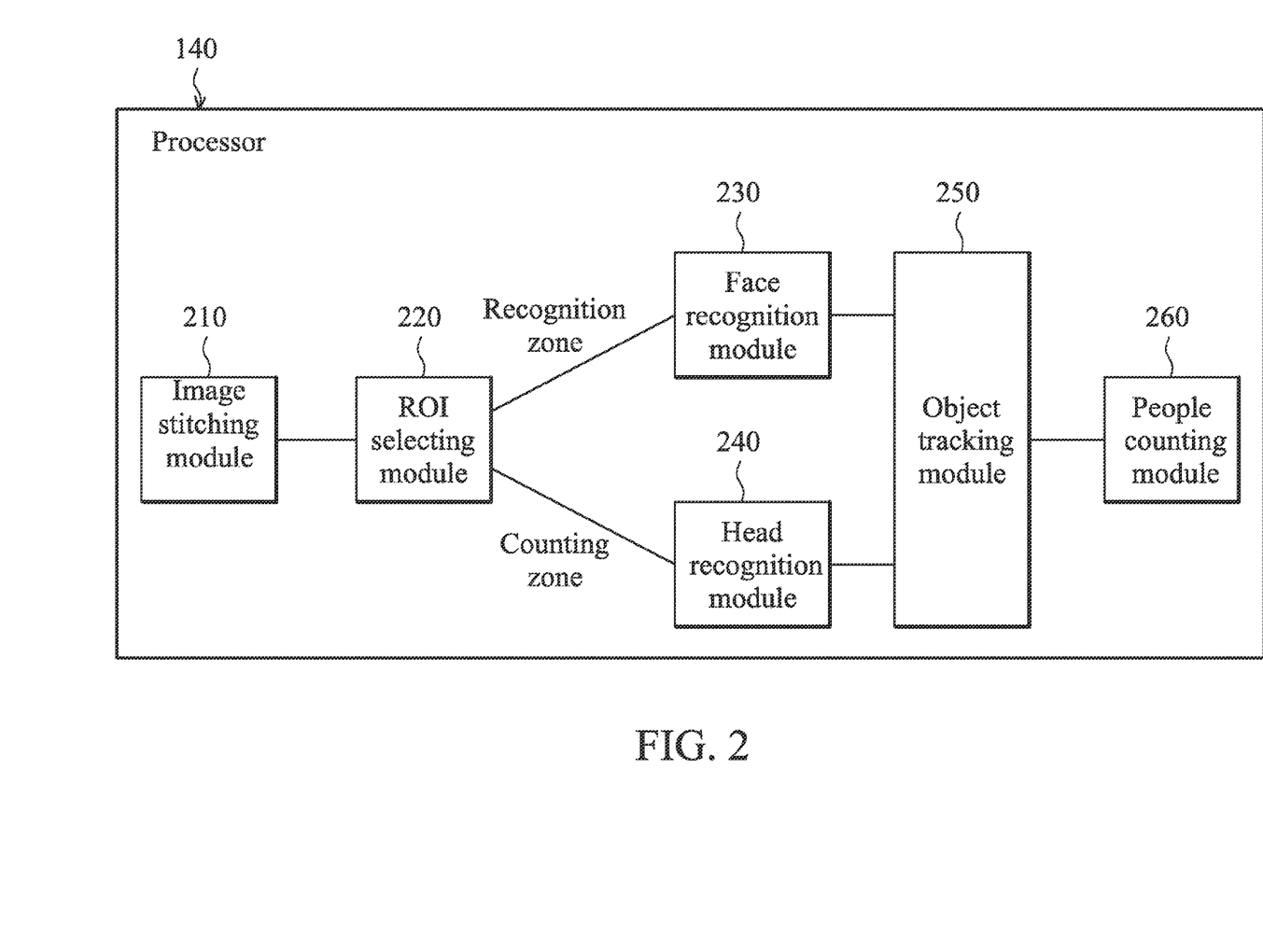
FIG. 2 is a schematic diagram of the processor according to an embodiment of the present invention.

FIG. 2 is a schematic diagram of the processor 140 according to an embodiment of the present invention. As shown in FIG. 2, the processor 140 comprises an image stitching module 210, a region of interest (ROI) selecting module 220, a face recognition module 230, a head recognition module 240, an object tracking module 250 and a people counting module 260.

Figure 3:
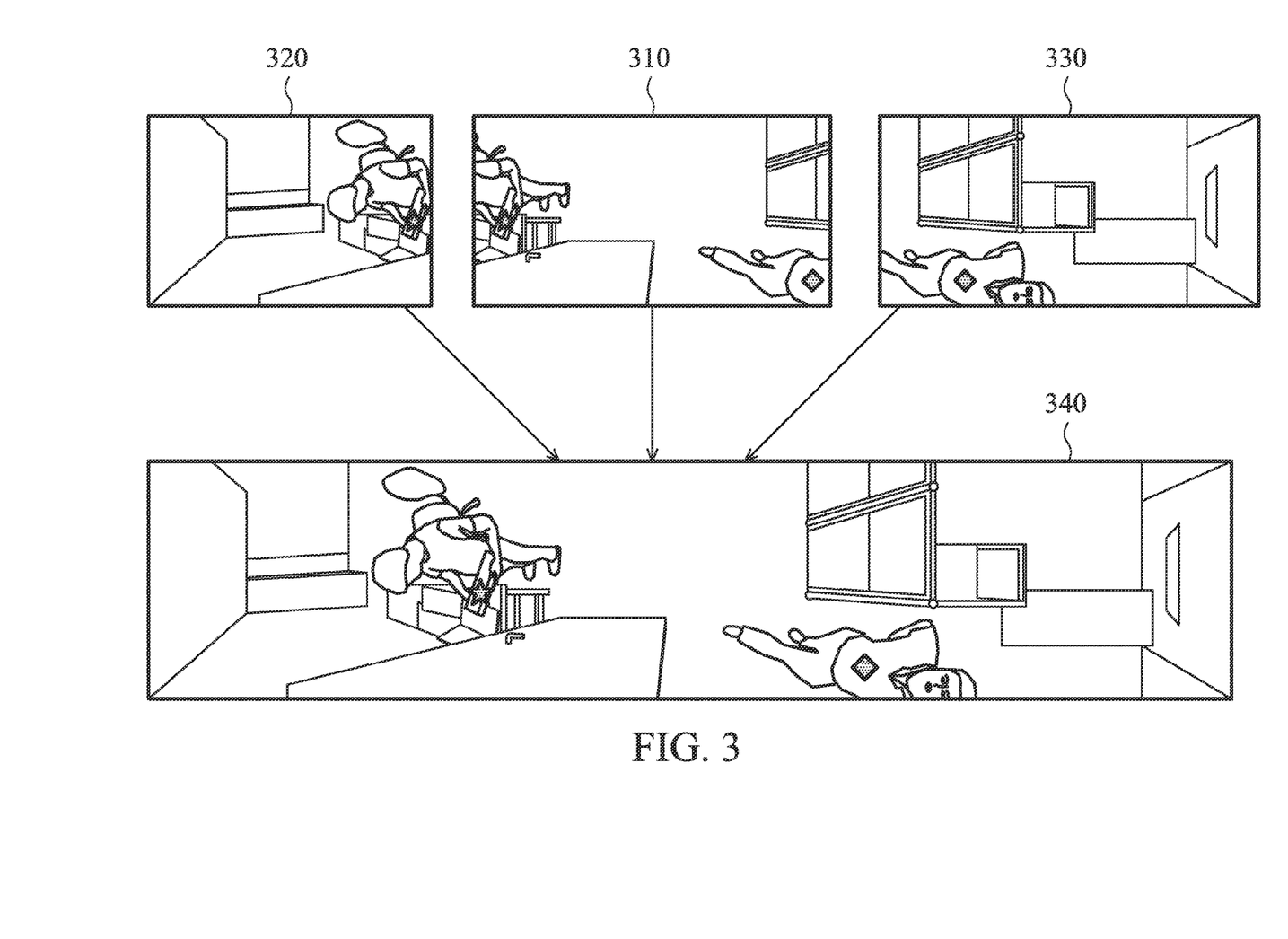
FIG. 3 is a schematic diagram illustrating an image features extraction method according to an embodiment of the present invention.

The image stitching module 210 is coupled to the top-view image-capturing device 110, the first side-view image-capturing device 120 and the second side-view image-capturing device 130 and is used to receive the top-view image, the first side-view image and the second side-view image captured by the image-capturing devices. Then, the image stitching module 210 stitches the top-view image, the first side-view image and the second side-view image into a wide-angle image or an ultra wide-angle image. The image stitching technology can use an image features extraction method, a spatial relation method or other technology to stitch the image. For example, as shown in FIG. 3, the image features extraction method is used to extract feature points from the top-view image 310, the first side-view image 320 and the second side-view image 330, respectively, such as the asterisks in the top-view image 310 and the first side-view image 320, and the diamonds in the top-view image 310 and the second side-view image 330. The image stitching module 210 obtains the corresponding relationship of the feature points by comparing the feature points, and stitches the top-view image 310, the first side-view image 320 and the second side-view image 330 into the ultra wide-angle image 340 according to the corresponding relationship. For another example, the spatial relation method is used to obtain a corresponding relationship according to positions in which the top-view image-capturing device 110, the first side-view image-capturing device 120 and the second side-view image-capturing device 130 are installed and stitch the top-view image 310, the first side-view image 320 and the second side-view image 330 into the ultra wide-angle image according to the corresponding relationship.

Figure 4:
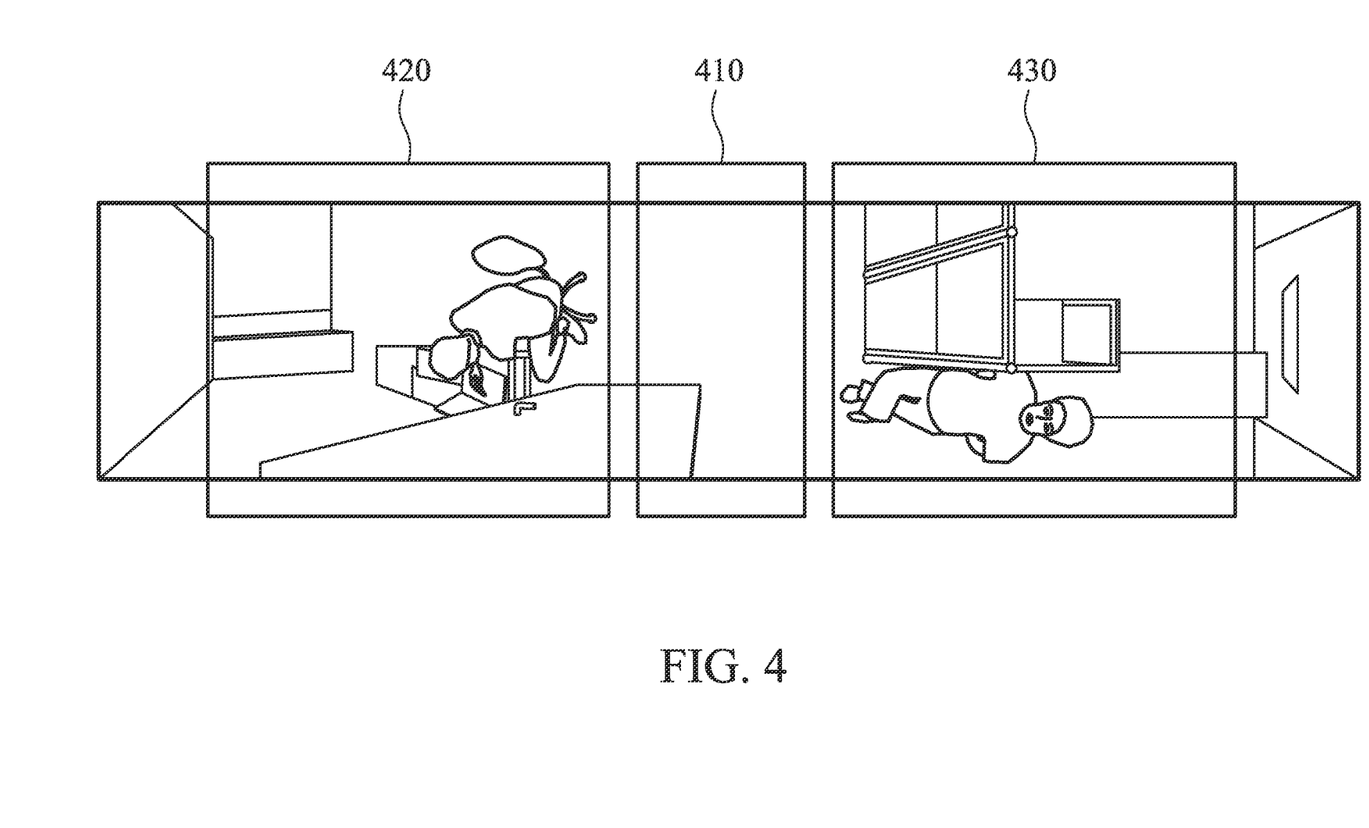
FIG. 4 is a schematic diagram for selecting a plurality of recognition zones and a counting zone according to an embodiment of the present invention.

The ROI selecting module 220 is coupled to the image stitching module 210 and is used to select at least one recognition zones and a counting zone from the ultra wide-angle image. In a preferred embodiment, the ROI selecting module 220 selects two recognition zones and a counting zone so that the ROI selecting module 220 can further determine a people moving direction (a person moves from left to right or from right to left). If the ROI selecting module 220 selects a single recognition zone, the ROI selecting module 220 merely determines a single direction (from left to right or from right to left). As shown in FIG. 4, the counting zone 420 is between the two recognition zones 420 and 430. In addition, the ranges of the counting zone and the recognition zone can be determined by the people counting system, or can also be determined by a user.

The face recognition module 230 is coupled to the ROI selecting module 220, receives the images in the recognition zone and monitors the recognition zone to determine a face location corresponding to a face through analyzing the recognition zone, wherein the face detection technology can be well-known technologies, such as the Viola-Jones algorithm or another technology. These technologies do not need to be illustrated elaborately.

Figure 5:
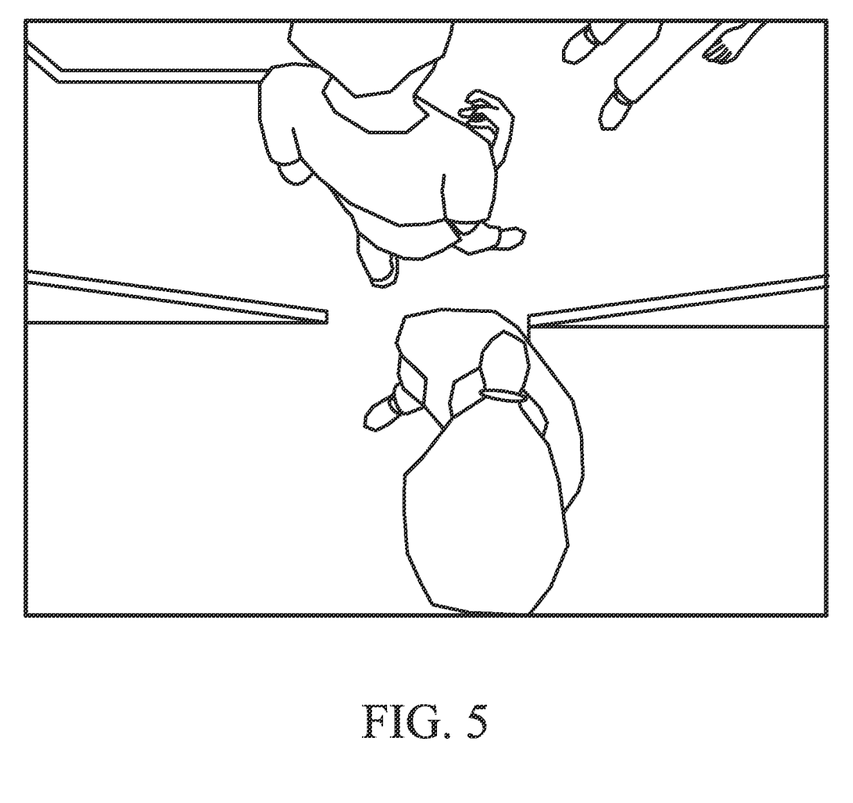
FIG. 5 is a schematic diagram illustrating an image in the counting zone according to an embodiment of the present invention.

The head recognition module 240 is coupled to the ROI selecting module 220 and receives the images in the counting zone, as shown in FIG. 5. The head recognition module 240 further monitors the counting zone to determine a head location corresponding to a head through analyzing the counting zone, wherein the head detection technology can use a background subtraction method, a segmentation method, a depth analysis method or other technologies. For example, when the head recognition module uses the background subtraction method, the head recognition module can obtain successive counting zone images and then determines the head location by comparing the successive counting zone images and subtracting a background from the successive counting zone images. In another example, when the head recognition module uses the segmentation method, the head recognition module can obtain successive counting zone images and then determines the head location by segmenting moving blocks from the successive counting zone images and detecting the moving blocks. In another example, when the ultra wide-angle image is an image having depth information, the head recognition module may obtain successive counting zone images from the counting zone during the time interval by using the depth analysis method and determine the head location from the successive counting zone images according to the depth information.

The object tracking module 250 is coupled to the face recognition module 230 and the head recognition module 240, and is used to generate a face track and a head track according to the face location and the head location, respectively, wherein the object tracking module 250 may be a particle filter.

The people counting module 260 is coupled to the object tracking module 250 and is used to count a first number of face tracks passing through the counting zone during a time interval and count a second number of head tracks passing through the counting zone during the time interval. Then, the people counting module 260 compares the first number with the second number to generate a people counting result. For example, during the time interval T, when the people counting module 260 determines that the first number is equal to the second number, it represents the number of heads passing through the counting zone being the same as the number of faces passing through the counting zone, and the number can be adopted. When the people counting module 260 finds that the first number is 1 and the second number is 0 during the time interval T, the number cannot be adopted. For example, the object tracking module 250 detects that a person passes through the counting zone from right to left, but the object tracking module 250 does not detect any head track. Since the first and second numbers are different because of errors caused by the people counting system, the number cannot be adopted.

Figure 6:
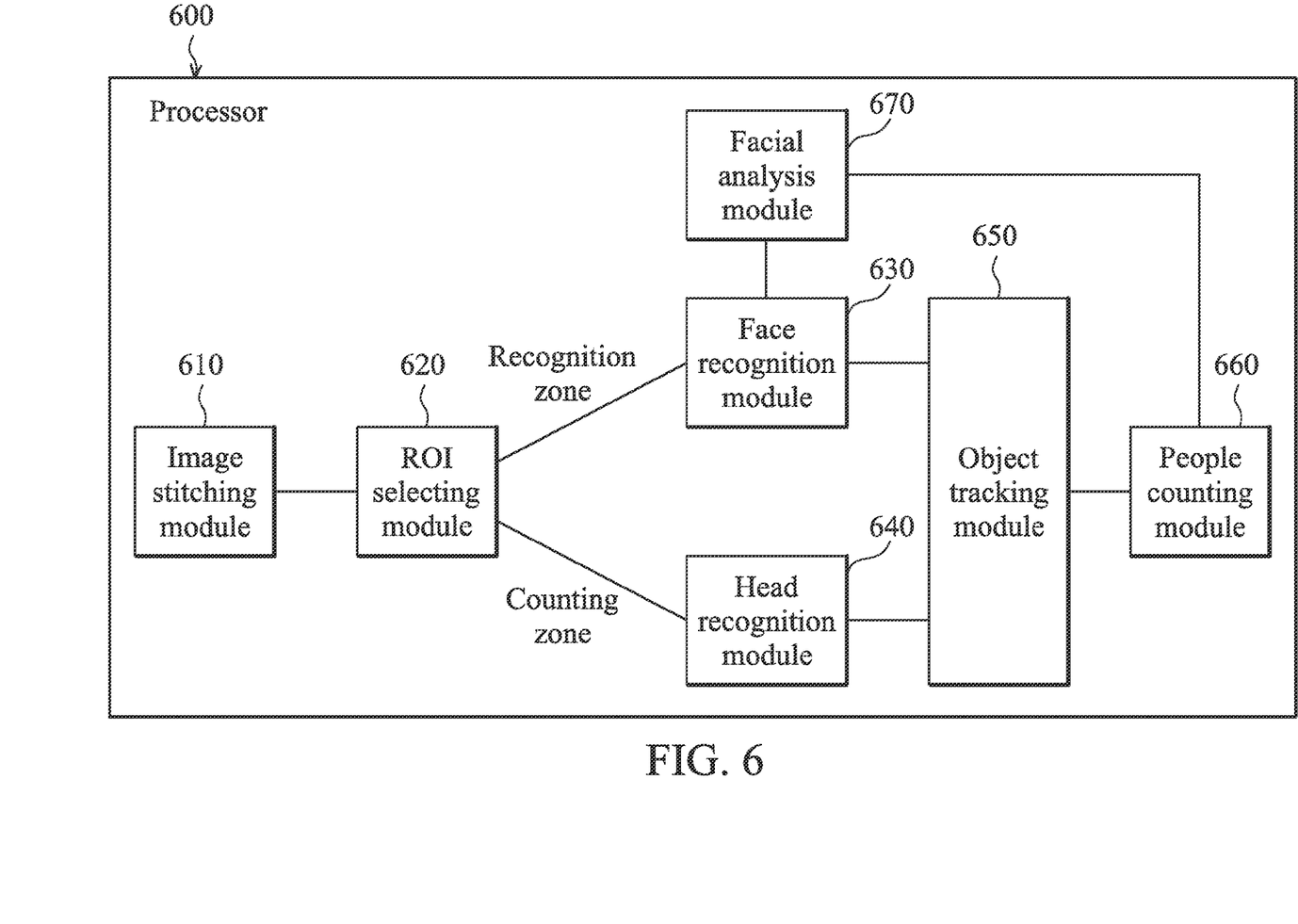
FIG. 6 is a schematic diagram of the processor according to another embodiment of the present invention.

FIG. 6 is a schematic diagram of the processor 600 according to another embodiment of the present invention. The processor 600 further comprises an image stitching module 610, a region of interest (ROI) selecting module 620, a face recognition module 630, a head recognition module 640, an object tracking module 650, a people counting module 660 and a facial analysis module 670. The components having the same name as described in FIGS. 1-2 have the same function. The main difference between FIG. 6 and FIG. 2 is that the processor 600 further includes the facial analysis module 670. In the embodiment of FIG. 6, the facial analysis module 670 can use a database (not shown in FIG. 6) storing pre-established face information to analyze the face monitored by the face recognition module 630. Using the facial analysis module 670 may further improve the analysis for counting the number of people and for security control. As one example, the facial analysis module 670 may determine a face, an identity and a gender, an estimate age and other information related with the face according to the database, and perform other analyses.

Figure 7:
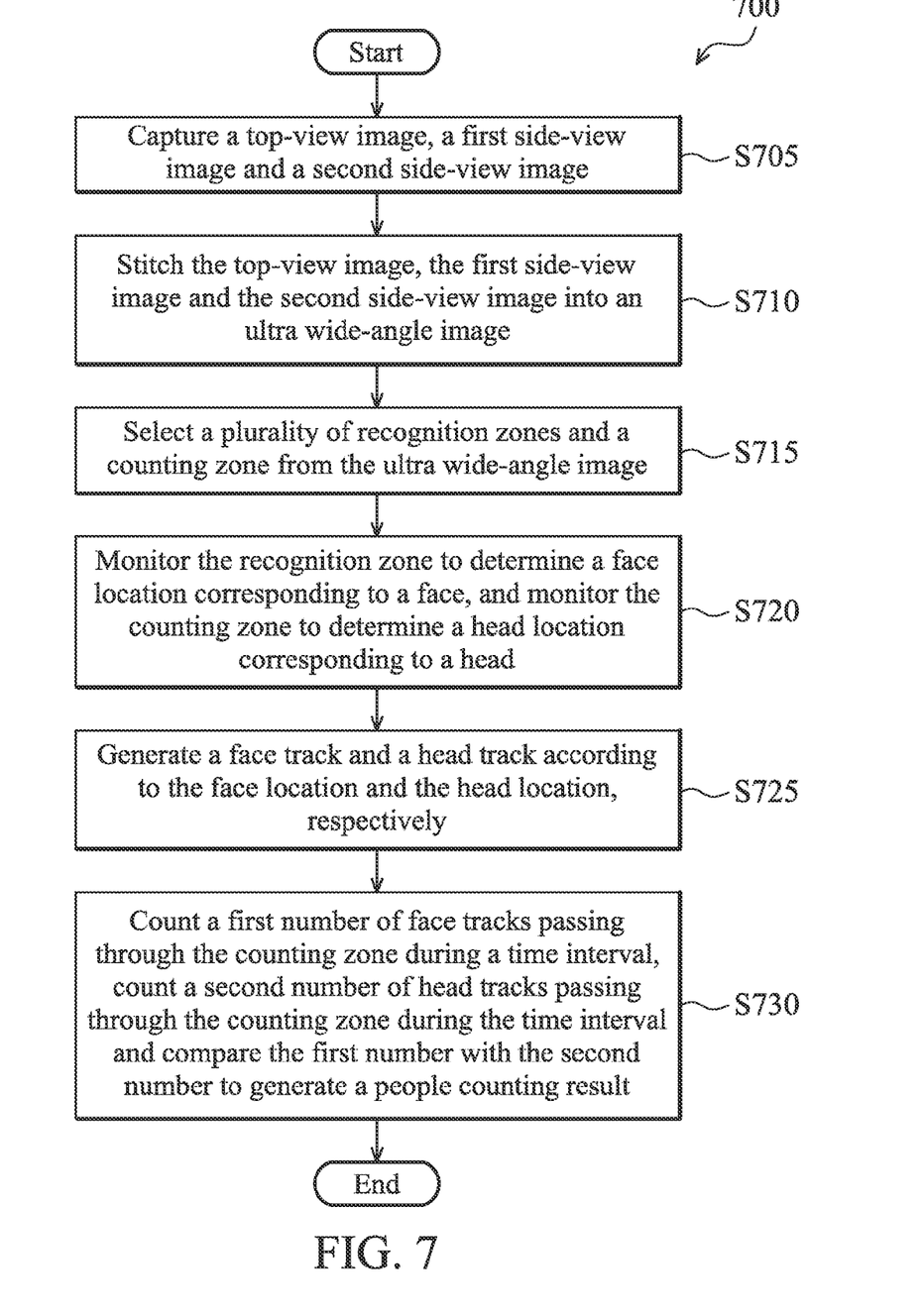
FIG. 7 is a flow diagram illustrating a people counting method according to an embodiment of the present invention with reference to FIGS. 1-2.

FIG. 7 is a flow diagram 700 illustrating a people counting method according to an embodiment of the present invention with reference to FIGS. 1-2. First, in step S705, a top-view image-capturing device captures a top-view image. A first side-view image-capturing device and a second side-view image-capturing device capture a first side-view image and a second side-view image, respectively. Then, in step S710, an image stitching module stitches the top-view image, the first side-view image and the second side-view image into an ultra wide-angle image. In step S715, a region of interest (ROI) selecting module selects a plurality of recognition zones and a counting zone from the ultra wide-angle image. Then, in step S720, the face recognition module monitors the recognition zone to determine a face location corresponding to a face, and a head recognition module monitors the counting zone to determine a head location corresponding to a head. In step S725, an object tracking module generates a face track and a head track according to the face location and the head location, respectively. Finally, in step S730, a people counting module counts a first number of face tracks passing through the counting zone during a time interval, counting a second number of head tracks passing through the counting zone during the time interval and compares the first number with the second number to generate a people counting result.

Figure 8A:
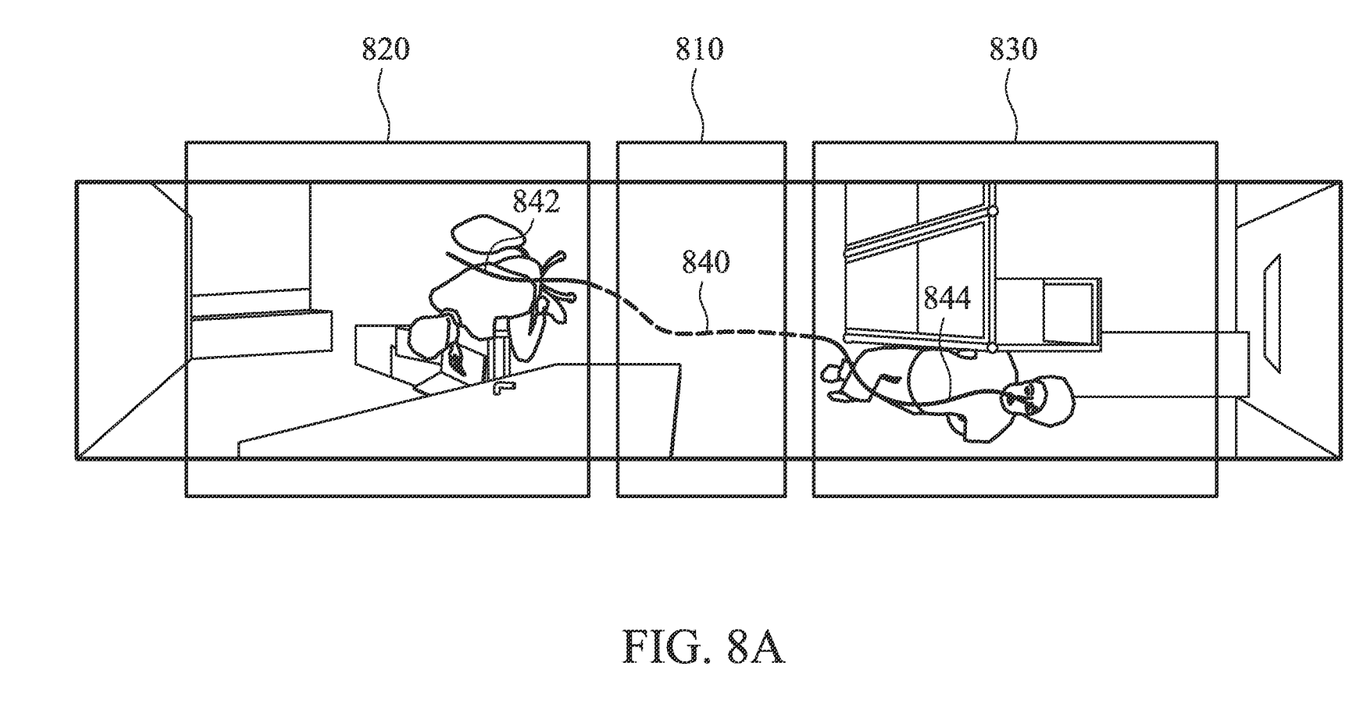
FIG. 8A is a schematic diagram illustrating a face track according to an embodiment of the present invention.
Figure 8B:
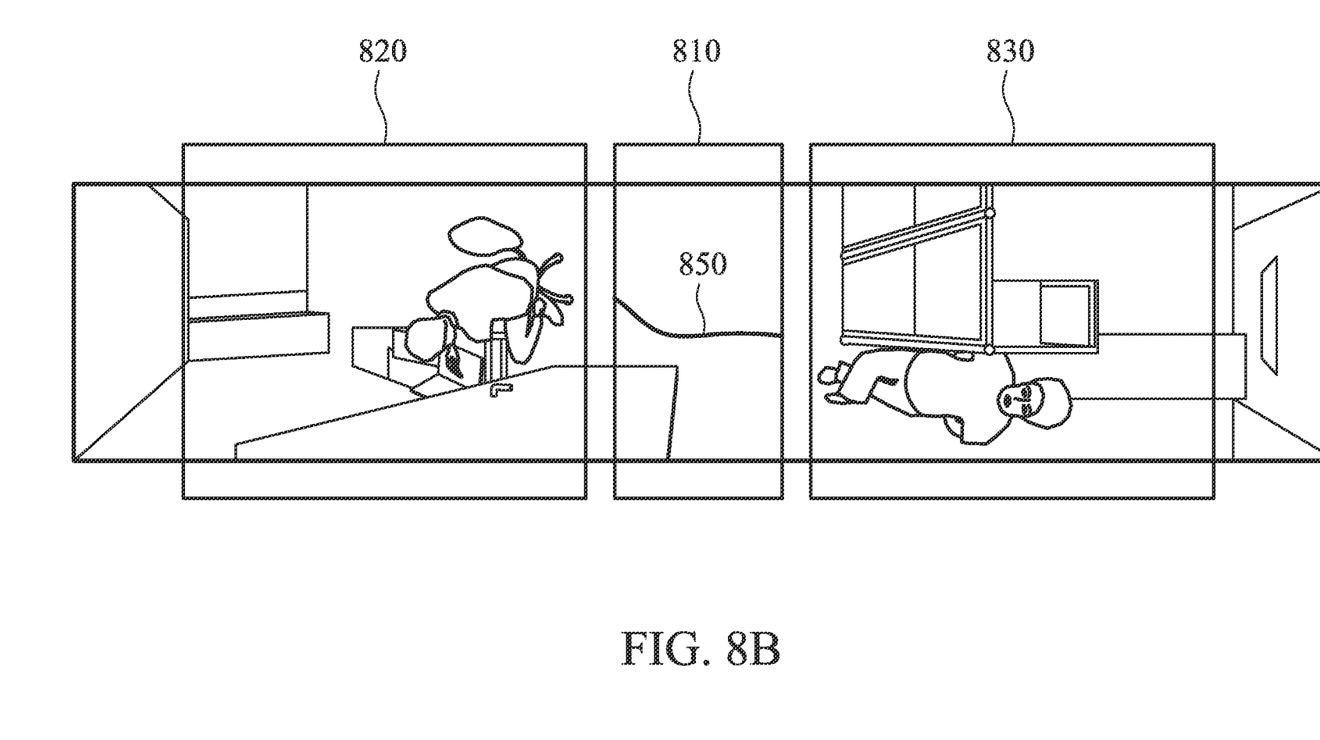
FIG. 8B is a schematic diagram illustrating a head track according to an embodiment of the present invention.

FIGS. 8A-8B are schematic diagrams illustrating that the object tracking module generates a face track and a head track according to an embodiment of the present invention. FIG. 8A shows a face track. As shown in FIG. 8A, the object tracking module generates solid face tracks 842 and 844 in recognition zones 820 and 830 according to face locations corresponding to the face monitored by the face recognition module, and derives a dotted head track 840 in a counting zone 810 according to the solid face tracks 842 and 844. FIG. 8B shows a head track. As shown in FIG. 8B, the object tracking module generates a head track 850 in the counting zone 810 according to a head location corresponding to the head monitored by the head recognition module. After the object tracking module generates the head track 850 and the face tracks 842 and 844, the people counting module counts a first number of solid face tracks 840 passing through the counting zone 810 during a time interval, counts a second number of head tracks 850 passing through the counting zone 810 during the time interval and compares the first number with the second number to generate a people counting result.

Therefore, the people counting system and method using image-capturing devices installed at different angles in the present invention may reduce counting errors caused by a situation where some human bodies are obscured by others to improve the accuracy of the count.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A people counting system, comprising:
   a top-view image-capturing device, capturing a top-view image;
   a first side-view image-capturing device, capturing a first side-view image;
   a second side-view image-capturing device, capturing a second side-view image;
   an image stitching module, coupled to the top-view image-capturing device, the first side-view image-capturing device and the second side-view image-capturing device and stitching the top-view image, the first side-view image and the second side-view image into ultra wide-angle image;

a region of interest (ROI) selecting module, coupled to the image stitching module and selecting at least one recognition zone and a counting zone from the ultra wide-angle image;

a face recognition module, coupled to the ROI selecting module and monitoring the recognition zone to determine a face location corresponding to a face through analyzing the recognition zone;

a head recognition module, coupled to the ROI selecting module and monitoring the counting zone to determine a head location corresponding to a head through analyzing the counting zone;

an object tracking module, coupled to the face recognition module and the head recognition module, and generating a face track and a head track according to the face location and the head location, respectively; and a people counting module, coupled to the object tracking module and counting a first number of face tracks passing through the counting zone during a time interval, counting a second number of head tracks passing through the counting zone during the time interval and comparing the first number with the second number to generate a people counting result.

2. The people counting system as claimed in claim 1, further comprising:

a facial analysis module, coupled to the face recognition module and analyzing the face to determine identity, gender, age and other information about the face according to a database.

3. The people counting system as claimed in claim 1, wherein the top-view image-capturing device is installed between the first side-view image-capturing device and the second side-view image-capturing device.

4. The people counting system as claimed in claim 1, wherein a number of the at least one recognition zone is two, and the counting zone is between the recognition zones.

5. The people counting system as claimed in claim 1, wherein the image stitching module extracts respective feature points from the top-view image, the first side-view image and the second side-view image, obtains a corresponding relationship by comparing the feature points, and stitches the top-view image, the first side-view image and the second side-view image into the ultra wide-angle image according to the corresponding relationship.

6. The people counting system as claimed in claim 1, wherein the image stitching module obtains a corresponding relationship according to positions in which the top-view image-capturing device, the first side-view image-capturing device and the second side-view image-capturing device are installed, and stitches the top-view image, the first side-view image and the second side-view image into the ultra wide-angle image according to the corresponding relationship.

7. The people counting system as claimed in claim 1, wherein the first side-view image-capturing device and the second side-view image-capturing device are installed at angles where the first side-view image-capturing device and the second side-view image-capturing device capture the face.

8. The people counting system as claimed in claim 1, wherein the head recognition module obtains successive counting zone images from the counting zone during the time interval and determines the head location by comparing the successive counting zone images and subtracting a background from the successive counting zone images.

9. The people counting system as claimed in claim 1, wherein the head recognition module obtains successive counting zone images from the counting zone during the time interval, determines the head location by segmenting moving blocks from the successive counting zone images and detecting the moving blocks.

10. The people counting system as claimed in claim 1, wherein the ultra wide-angle image is an image having depth information, the head recognition module obtains successive counting zone images from the counting zone during the time interval and determines the head location from the successive counting zone images according to the depth information.

* * * * *